(12) United States Patent
Imai et al.

(10) Patent No.: US 12,384,386 B2
(45) Date of Patent: Aug. 12, 2025

(54) INFORMATION OUTPUT APPARATUS AND INFORMATION OUTPUT METHOD

(71) Applicant: ISUZU MOTORS LIMITED, Tokyo (JP)

(72) Inventors: Akira Imai, Fujisawa (JP); Kenji Hori, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 300 days.

(21) Appl. No.: 18/181,069

(22) Filed: Mar. 9, 2023

(65) Prior Publication Data

US 2023/0294712 A1    Sep. 21, 2023

(30) Foreign Application Priority Data

Mar. 17, 2022    (JP) .................................. 2022-042363

(51) Int. Cl.
*B60W 40/13*    (2012.01)
*B60W 50/14*    (2020.01)

(52) U.S. Cl.
CPC ............ *B60W 40/13* (2013.01); *B60W 50/14* (2013.01); *B60W 2050/146* (2013.01)

(58) Field of Classification Search
CPC ........ B60K 2360/166; B60K 2360/171; B60K 2360/1876; B60K 35/22; B60K 35/28; B60K 35/654; B60K 35/85; B60W 2300/12; B60W 2300/125; B60W 2530/10; B60W 2530/203; G01G 19/08; G01G 23/36; G01G 23/3707; G01G 23/3728; G07C 5/0816
See application file for complete search history.

(56) References Cited

FOREIGN PATENT DOCUMENTS

| JP | 2002114310 A | | 4/2002 |
|---|---|---|---|
| JP | 2002197593 A | | 7/2002 |
| JP | 2004227267 A | | 8/2004 |
| JP | 2009-001257 A | | 1/2009 |
| JP | 2016102662 A | * | 6/2016 |
| JP | 2017096704 A | | 6/2017 |
| JP | 2020085514 A | | 6/2020 |

* cited by examiner

*Primary Examiner* — Charles J Han
(74) *Attorney, Agent, or Firm* — Shih IP Law Group, PLLC

(57) ABSTRACT

An information output apparatus including: an acquisition part that acquires vehicle identification information of a trailer; vehicle identification information of a tractor, a measured tractor weight measured by a tractor-uncoupled rear axle weight sensor, a calculation part that calculates a second measured load on the basis of the weight of the tractor stored in the storage in association with the vehicle identification information of the tractor and the measured tractor weight to calculate the carried load by subtracting the weight of the trailer stored in the storage in association with the vehicle identification information of the trailer from a total value of the acquired, measured trailer load and the calculated fifth wheel load, and an output part that outputs information indicating the carried load.

5 Claims, 7 Drawing Sheets

| TRACTOR ID | WHEELBASE (mm) | COUPLER OFFST (mm) | TRACTOR-UNCOUPLED REAR AXLE WEIGHT (kg) | ... |
|---|---|---|---|---|
| T101 | 7000 | 1300 | 2700 | ... |
| T102 | 6500 | 1400 | 2650 | ... |
| ... | ... | ... | ... | ... |

FIG. 4

| TRAILER ID | TRAILER WEIGHT (kg) | ... |
|---|---|---|
| L101 | 7000 | ... |
| L102 | 6000 | ... |
| ... | ... | ... |

FIG. 5

INFORMATION OUTPUT APPARATUS AND INFORMATION OUTPUT METHOD

CROSS-REFERENCE TO RELATED APPLICATION

The present application claims priority to Japanese Patent Applications number 2022-042363, filed on Mar. 17, 2022. The contents of this application are incorporated herein by reference in their entirety.

BACKGROUND OF THE INVENTION

The present disclosure relates to an information output apparatus and an information output method for outputting information of a vehicle.

Calculating the weight of loaded goods loaded on a trailer of a truck is performed. For example, in Japanese Unexamined Patent Application Publication No. 2009-1257, it is described that the weight of loaded goods is calculated using the load measured with a load detection part provided in a suspension device of rear wheels of a trailer when the loaded goods are loaded, a vehicle body weight of the trailer, and the like.

In the technique described in Japanese Unexamined Patent Application Publication No. 2009-12577, there is a problem that the weight of the loaded goods cannot be calculated when the trailer towed by the tractor is changed to another trailer because the weight of the vehicle body and the like of the trailer change.

SUMMARY

The present disclosure focuses on this point, and its object is to provide an information output apparatus and an information output method capable of calculating the weight of loaded goods when a trailer towed by a tractor is changed to another trailer.

An information output apparatus according to a first aspect of the present disclosure is an information output apparatus that outputs information indicating a carried load of loaded goods mounted on a trailer in a vehicle configured with a tractor and the trailer, and including: a storage that stores vehicle identification information of a plurality of tractors in association with the weight of each of the tractors, and stores vehicle identification information of a plurality of trailers in association with the weight of each of the trailers; an acquisition part that acquires the vehicle identification information of the trailer, the vehicle identification information of the tractor, a measured tractor weight measured by a tractor-uncoupled rear axle weight sensor attached to the tractor, and a first measured load measured by a trailer weight sensor attached to the trailer; a calculation part that calculates a second measured load on the basis of the weight of the tractor stored in the storage in association with the vehicle identification information of the tractor acquired by the acquisition part and the measured tractor weight, and calculates the carried load by subtracting the weight of the trailer stored in the storage in association with the vehicle identification information of the trailer acquired by the acquisition part from a total value of the second measured load and the first measured load; and an output part that outputs information indicating the carried load calculated by the calculation part.

An information output method according to a second aspect of the present disclosure is an information output method for outputting information indicating a carried load of loaded goods mounted on a trailer in a vehicle configured with a tractor and the trailer, the method including computer-implemented steps of: acquiring vehicle identification information of the trailer, vehicle identification information of the tractor, a measured tractor weight measured by a tractor-uncoupled rear axle weight sensor attached to the tractor, and a first measured load measured by a trailer weight sensor attached to the trailer; calculating, by referencing a storage that stores vehicle identification information of a plurality of tractors in association with the weight of each of the tractors and stores vehicle identification information of a plurality of trailers in association with the weight of each of the trailers, a second measured load on the basis of (i) the weight of the tractor stored in the storage in association with the acquired vehicle identification information of the tractor and (ii) the measured tractor weight, and calculating the carried load by subtracting the weight of the trailer stored in the storage in association with the acquired vehicle identification information of the trailer from a total value of the second measured load and the first measured load; and outputting information indicating the calculated carried load.

BRIEF DESCRIPTION OF THE DRAWINGS

FIG. 4 shows an example of tractor specification information.

FIG. 5 shows an example of trailer specification information.

DESCRIPTION OF EMBODIMENTS

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Outline of an information output system S]

Figure 1:
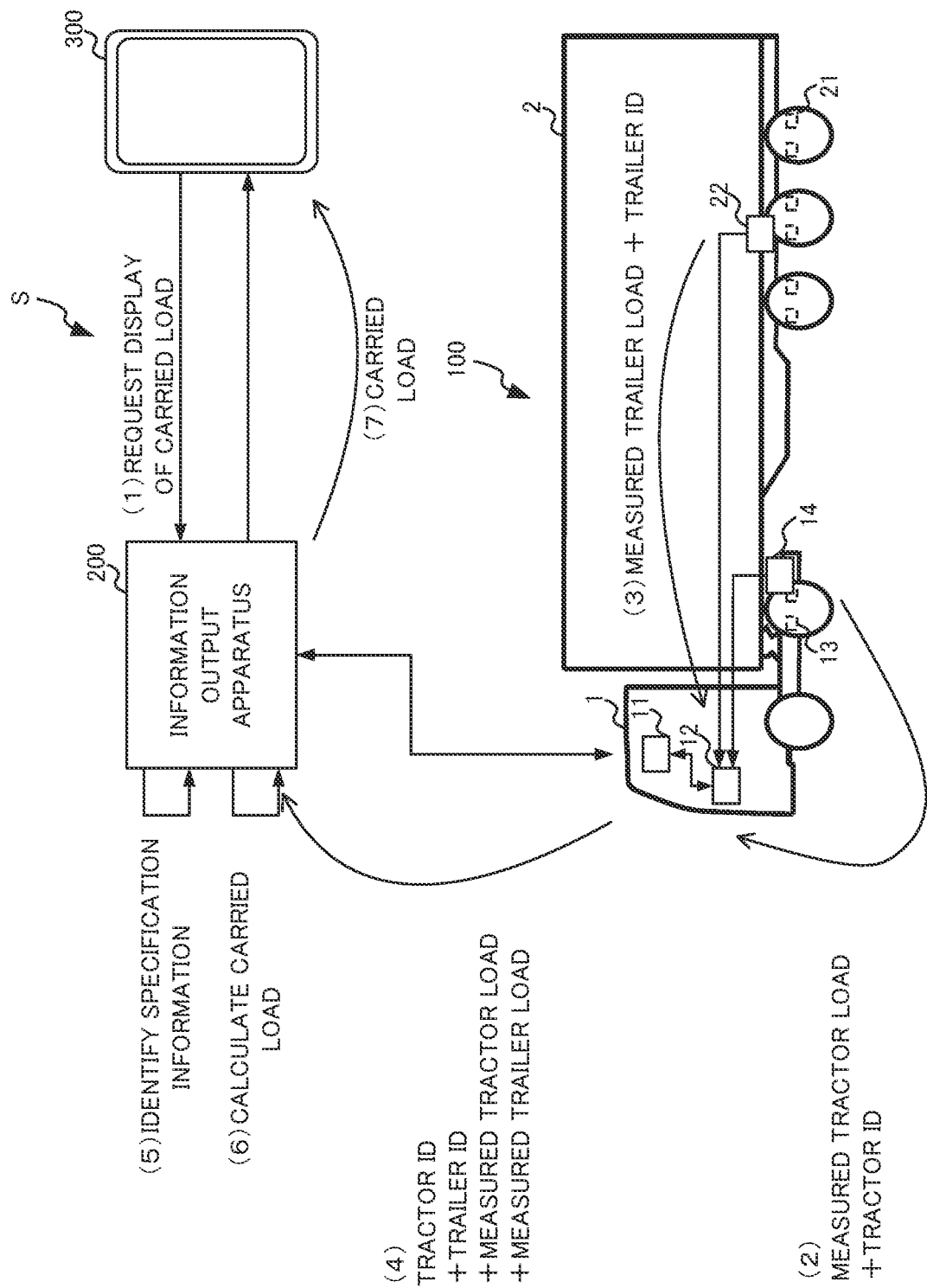
FIG. 1 is a diagram showing an outline of an information output system according to an embodiment.
Figure 2:
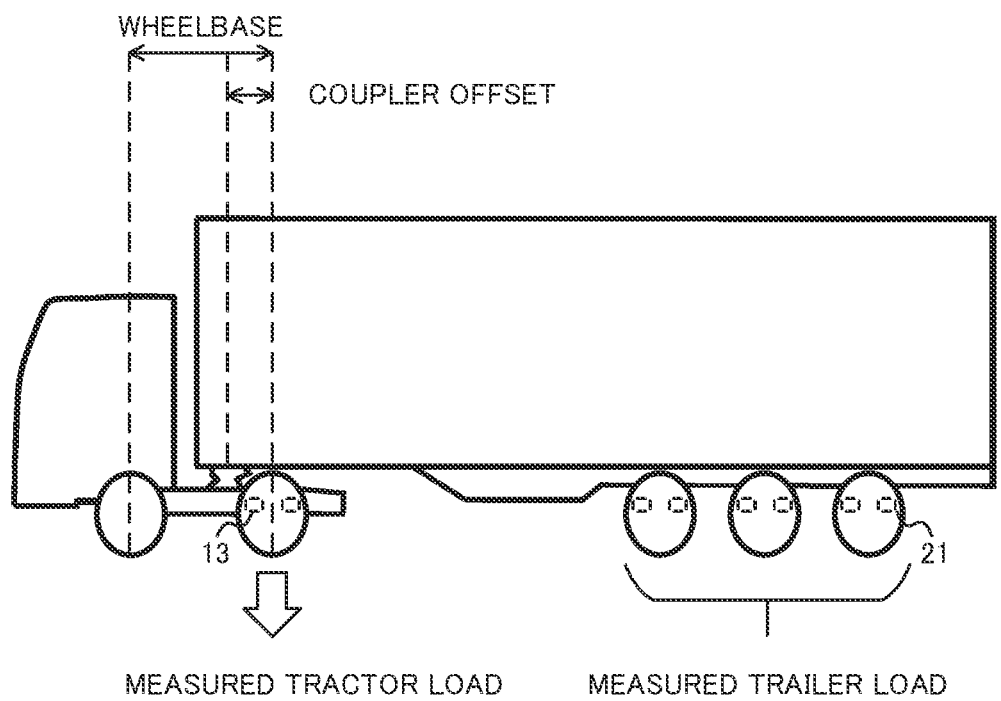
FIG. 2 shows an example of a measuring method for a measured tractor load and a measured trailer load.

FIG. 1 is a diagram showing an outline of an information output system S according to the embodiment. FIG. 2 shows an example of a measuring method for a measured tractor load and a measured trailer load. The information output system S is a system for displaying the carried load of a trailer 2 on an information terminal 300 of a user, such as an administrator or a driver of a vehicle, by having the user set a tractor ID of the tractor 1 that the user wishes to grasp its carried load regardless of the type of the trailer 2 connected to the tractor 1. The information output system S includes a vehicle 100, an information output apparatus 200, and the information terminal 300.

The vehicle 100 includes the tractor 1 and the trailer 2. The tractor 1 includes a telematics unit 11, a first controller 12, a tractor-uncoupled rear axle weight sensor 13, and a second controller 14. The trailer 2 includes a trailer weight sensor 21 and a third controller 22.

The telematics unit 11 is a communication module for wirelessly communicating with the information output apparatus 200 via a network. The first controller 12 is an electronic control unit (ECU), for example. The first controller 12 communicates with the second controller 14 and the third controller 22. The first controller 12 communicates with the information output apparatus 200 via the telematics unit 11.

The tractor-uncoupled rear axle weight sensor 13 is provided in an air suspension, for example. The tractor-uncoupled rear axle weight sensor 13 measures the measured tractor load (corresponding to a measured tractor weight) by measuring air pressure inside the air suspension. The measured tractor load is a load applied to rear wheels of the tractor 1 as indicated by a thick arrow in FIG. 2.

The second controller 14 is an ECU, for example. The second controller 14 communicates with the first controller 12. The second controller 14 acquires the measured tractor load measured by the tractor-uncoupled rear axle weight sensor 13.

The trailer weight sensor 21 is provided in an air suspension, for example. The trailer weight sensor 21 measures the load applied to a plurality of wheels of a trailer. In the example of the present specification, the trailer weight sensor 21 measures the measured trailer load (corresponding to a first measured load) by measuring air pressure inside the air suspension. As shown in FIG. 2, the measured trailer load is the sum of loads applied to a plurality of wheels of the trailer 2.

The third controller 22 is an ECU, for example. The third controller 22 communicates with the first controller 12. The third controller 22 acquires, from the trailer weight sensor 21, the measured trailer load that has been measured.

The information output apparatus 200 is a server, for example. The information output apparatus 200 communicates with the vehicle 100 and the information terminal 300 via a network. The information output apparatus 200 stores vehicle identification information of a plurality of tractors (hereinafter, also referred to as tractor ID s) in association with specification information such as a tractor-uncoupled rear axle weight (corresponding to the weight of a tractor) of each of the plurality of tractors. The information output apparatus 200 stores vehicle identification information of a plurality of trailers (hereinafter also referred to as trailer IDs) in association with specification information such as the weight of each trailer. The information terminal 300 is a smartphone owned by a driver of the vehicle 100, for example. The information terminal 300 communicates with the information output apparatus 200 via a network.

The information output apparatus 200 is characterized by outputting information indicating the carried load of loaded goods loaded on the trailer 2 of the vehicle 100. Hereinafter, with reference to FIG. 1, processing of the information output apparatus 200 outputting the information indicating the carried load will be described.

When the driver or the administrator of the vehicle 100 performs an operation for displaying the carried load of the vehicle 100 in the information terminal 300, the information terminal 300 transmits a carried load display request together with a tractor ID to the information output apparatus 200 ((1) in FIG. 1). Thereafter, the information output apparatus 200 periodically requests information indicating the load measured in the vehicle 100, for example.

In the vehicle 100 that has received the request for the information indicating the load, the second controller 14 transmits, to the first controller 12, information indicating the measured tractor load measured by the tractor-uncoupled rear axle weight sensor 13. The second controller 14 transmits the tractor ID to the first controller 12 together with the information indicating the measured tractor load ((2) in FIG. 1).

The third controller 22 transmits, to the first controller 12, information indicating the measured trailer load measured by the trailer weight sensor 21. The third controller 22 transmits the trailer ID to the first controller 12 together with the information indicating the measured trailer load ((3) in FIG. 1). The first controller 12 transmits, to the information output apparatus 200, the tractor ID acquired from the second controller 14, the information indicating the measured tractor load, the trailer ID acquired from the third controller 22, and the information indicating the measured trailer load ((4) in FIG. 1).

The information output apparatus 200 identifies specification information such as the tractor-uncoupled rear axle weight stored in the storage 202 (see FIG. 3 described later) in association with a tractor ID that is the same as the tractor ID acquired from the information terminal 300. The information output apparatus 200 identifies, from the first controller 12, the specification information such as the trailer weight stored in the storage 202 in association with the trailer ID that is the same as the trailer ID acquired together with the tractor ID, which is acquired from the information terminal 300 ((5) in FIG. 1).

The information output apparatus 200 calculates a fifth wheel load (corresponding to a second measured load) on the basis of the measured tractor load acquired from the vehicle 100 and the stored tractor-uncoupled rear axle weight. The fifth wheel load is the load by which the tractor 1 supports the trailer 2 in a coupler, which is a coupling unit between the tractor 1 and the trailer 2. The information output apparatus 200 identifies the carried load of the trailer 2 by subtracting the identified trailer weight from a total value of the acquired measured trailer load and the calculated fifth wheel load ((6) in FIG. 1). The information output apparatus 200 outputs the calculated carried load to the information terminal 300 of the user who has requested the display of the carried load of the vehicle 100 ((7) in FIG. 1).

In this manner, the information output apparatus 200 identifies the specification information corresponding to the tractor ID and the specification information corresponding to the trailer ID, and calculates the carried load of the trailer 2 on the basis of the identified specification information. Therefore, the information output apparatus 200 can calculate the weight of loaded goods even when the trailer 2 towed by the tractor 1 is changed to another trailer 2.

[Configuration of the information output apparatus 200]

Figure 3:
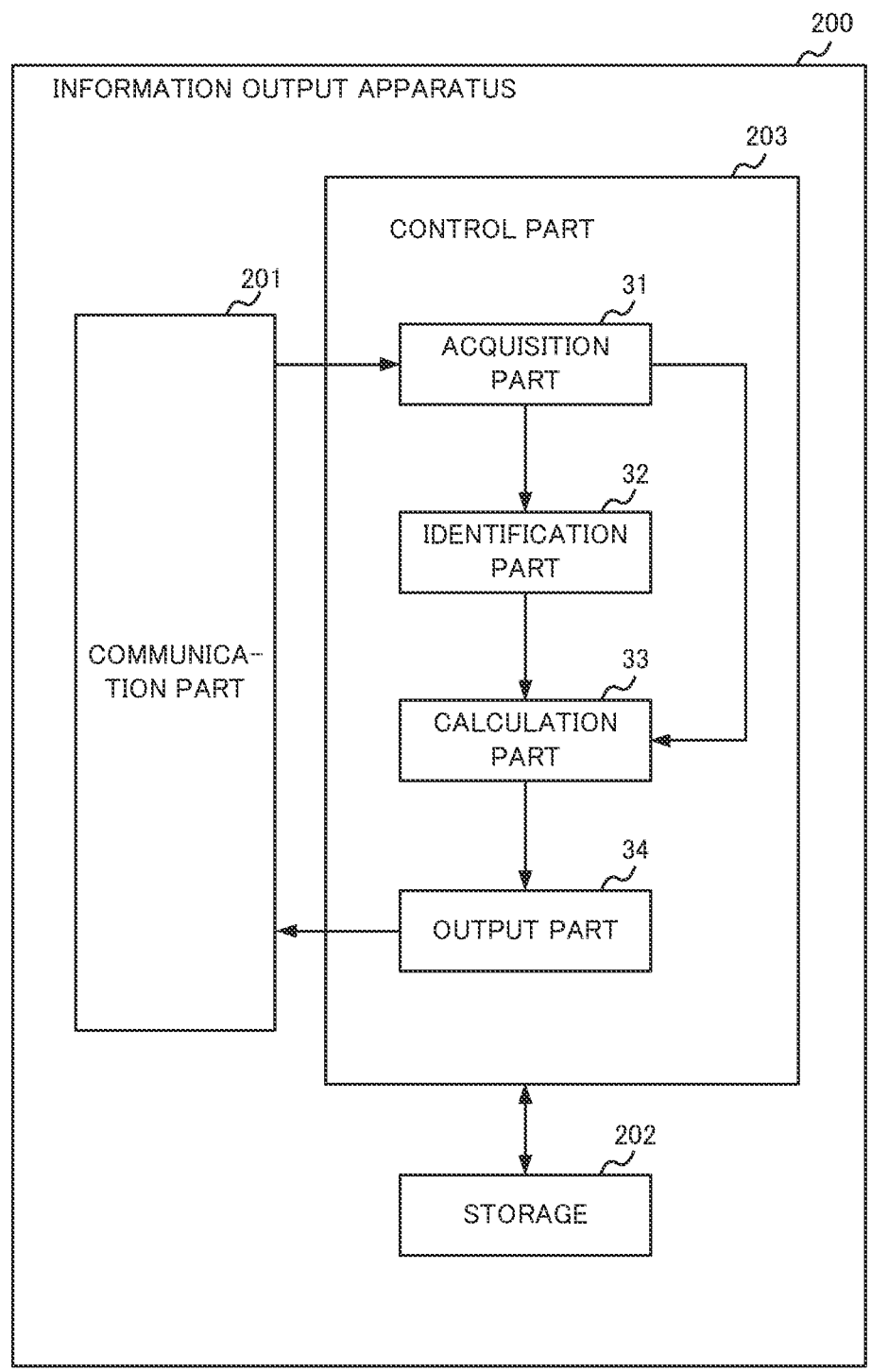
FIG. 3 shows a configuration of an information output apparatus.

FIG. 3 shows a configuration of the information output apparatus 200. The information output apparatus 200 includes a communication part 201, a storage 202, and a control part 203. The control part 203 includes an acquisition part 31, an identification part 32, a calculation part 33, and an output part 34.

The communication part 201 is an interface for communicating with the vehicle 100 and the information terminal 300. The storage 202 includes a read only memory (ROM), a random access memory (RAM), and the like, for example. The storage 202 stores various types of data and various types of programs for causing the control part 203 to function.

The storage 202 stores tractor specification information in which a plurality of tractor IDs are associated with their respective tractor-uncoupled rear axle weights, coupler offsets, and wheelbases. The tractor specification information is information concerning the dimensions and weight of each part of the tractor 1. FIG. 4 shows an example of the tractor specification information. The wheelbase is the distance between the front wheel center and the rear wheel center of a tractor, as shown in FIG. 2. The coupler offset is the distance between the rear wheel center of the tractor and the coupler, as shown in FIG. 2. The coupler is the coupling unit between the tractor 1 and the trailer 2. The tractor-uncoupled rear axle weight is a load applied to rear wheels of the tractor 1 measured by the tractor-uncoupled rear axle weight sensor 13 in a state in which the trailer 2 is not coupled to the tractor 1.

In the tractor specification information stored in the storage 202, a tractor ID "T101," a wheelbase of "7000" millimeters, a coupler offset of "1300" millimeters, and a tractor-uncoupled rear axle weight of "2700" kilograms are associated with each other in the example of the first row from the top of FIG. 4. In the tractor specification information stored in the storage 202, a front axle weight may be associated with the tractor ID. The front axle weight is a load applied to front wheels of the tractor 1 in a state in which the trailer 2 is not coupled to the tractor 1.

The storage 202 stores trailer specification information in which a plurality of trailer IDs are associated with each trailer's vehicle weight. FIG. 5 shows an example of trailer specification information. The trailer weight indicates the weight of a trailer in a state in which no load is loaded. In the example of the first row from the top of FIG. 5, the trailer ID "L101" and the trailer weight of "7000" kilograms are associated.

The storage 202 stores driver information in which the tractor ID and a user ID of the information terminal 300 of the driver of the tractor 1 are associated. The storage 202 stores load history information in which (i) a plurality of tractor IDs, (ii) a plurality of pieces of location information indicating locations of the vehicle 100, (iii) acquisition timings at which the plurality of pieces of location information are acquired, and (iv) the carried loads of the vehicle 100 corresponding to the plurality of acquisition timings are associated with each other. The load history information indicates past time-series changes in the carried load of the vehicle 100.

The control part 203 is a central processing unit (CPU), for example. The control part 203 functions as the acquisition part 31, the identification part 32, the calculation part 33, and the output part 34 by executing the programs stored in the storage 202.

The acquisition part 31 acquires various types of information from the vehicle 100 via the communication part 201. The acquisition part 31 acquires the tractor ID and the measured tractor load measured by the tractor-uncoupled rear axle weight sensor 13 which is attached to the tractor 1. The acquisition part 31 acquires the trailer ID and the measured trailer load (corresponding to the first measured load) measured by the trailer weight sensor 21 which is attached to the trailer 2. The acquisition part 31 acquires location information indicating a location of a vehicle.

The acquisition part 31 acquires the measured tractor load, the tractor ID, the measured trailer load, the trailer ID, and the location information for every predetermined time period, for example. The predetermined time period is preset by the driver of the vehicle 100, and may be one minute or ten minutes for example. The acquisition part 31 may acquire the measured tractor load or the like when the vehicle 100 stops. The acquisition part 31 causes the storage 202 to store vehicle information in which the acquired (i) tractor ID, (ii) date and time of acquiring the tractor ID, (iii) measured tractor load, (iv) trailer ID, (v) measured trailer load, and (vi) location information are associated with each other.

In addition, the acquisition part 31 acquires (i) a user's instruction requesting an output of the carried load and (ii) the tractor ID from the information terminal 300. The acquisition part 31 references the vehicle information stored in the storage 202, and acquires the measured tractor load, the trailer ID, and the measured trailer load stored in association with the tractor ID which is acquired from the information terminal 300. The acquisition part 31 outputs the acquired tractor ID and trailer ID to the identification part 32. The acquisition part 31 outputs the acquired measured tractor load and measured trailer load to the calculation part 33.

The identification part 32 identifies the tractor-uncoupled rear axle weight which is stored in the storage 202 in association with the tractor ID acquired by the acquisition part 31 from the information terminal 300 of the user. The identification part 32 identifies the coupler offset and the wheelbase stored in the storage 202 in association with the tractor ID acquired by the acquisition part 31, in addition to the tractor-uncoupled rear axle weight. In the example of FIG. 4, when the acquisition part 31 acquires the tractor ID "T101," the identification part 32 identifies the wheelbase of "7000" millimeters, the coupler offset of "1300" millimeters, and the tractor-uncoupled rear axle weight of "2700" kilograms, which are associated with the tractor ID "T101" in the tractor specification information stored in the storage 202. The identification part 32 may identify the front axle weight stored in the storage 202 in association with the tractor ID acquired by the acquisition part 31.

The identification part 32 identifies the trailer weight stored in the storage 202 in association with the trailer ID associated with the tractor ID acquired by the acquisition part 31 from the information terminal 300 of the user. In the example of FIG. 5, supposing that the acquisition part 31 has acquired the trailer ID "L101," the identification part 32 identifies the trailer weight "7000" kilogram associated with the trailer ID "L101" in the tractor specification information stored in the storage 202.

The calculation part 33 calculates the carried load of the trailer 2. First, the calculation part 33 measures the fifth wheel load on the basis of the tractor-uncoupled rear axle weight acquired by the identification part 32 and the measured tractor load acquired by the acquisition part 31. In the example of the present specification, the calculation part 33 calculates the fifth wheel load on the basis of the identified coupler offset and the identified wheelbase in addition to the tractor-uncoupled rear axle weight identified by the identification part 32 and the measured tractor load acquired by the acquisition part 31.

More specifically, the calculation part 33 calculates the fifth wheel load by dividing the product of the value obtained by subtracting the tractor-uncoupled rear axle weight identified by the identification part 32 from the measured tractor load measured by the tractor-uncoupled rear axle weight sensor 13 and the identified wheelbase by the value obtained by subtracting the identified coupler offset from the wheelbase. When expressed by a mathematical equation, the calculation part 33 calculates the fifth wheel load (FWL) (kg) with the following equation.

$$FWL = (DAL - DAW) * (WB / (WB - CO)) \quad (1)$$

In Equation 1, DAL is the measured tractor load (kg), DAW is the tractor-uncoupled rear axle weight (kg), WB is a wheelbase (mm), and CO is coupler offset (mm).

Next, the calculation part 33 calculates a total value of the calculated fifth wheel load and the measured trailer load acquired by the acquisition part 31. The calculation part 33 calculates the carried load by subtracting the trailer weight identified by the identification part 32 from the calculated total value. When expressed by a mathematical equation, the calculation part 33 calculates the carried load CL (kg) of the trailer with the following equation.

$$CL = ALS + FWL - TVW \quad (2)$$

In Equation 2, ALS is the measured trailer load (kg), and TVW is the trailer weight (kg).

The calculation part 33 can accurately calculate the fifth wheel load from the measured tractor load measured by the tractor-uncoupled rear axle weight sensor 13, using the fact that the wheelbase and the coupler offset do not change. Since the calculation part 33 calculates the carried load using the calculated fifth wheel load and the measured trailer load measured by the trailer weight sensor 21, it is possible to prevent the occurrence of an error in the calculated carried load even when positions of the loaded goods in the trailer 2 change. Therefore, the calculation part 33 can improve accuracy of calculating the carried load.

The calculation part 33 may calculate a front axle load which is a load applied to the front wheels of the tractor 1. For example, the calculation part 33 calculates the front axle load with the following equation.

$$FAL = FAW + FWL*(CO/WB) \quad (3)$$

In Equation 3, FAL is the front axle load (kg), and FAW is the front axle weight (kg). The calculation part 33 notifies the output part 34 of the calculated carried load and front axle load.

[Outputting of Information Indicating the Carried Load]

The output part 34 communicates with the vehicle 100 or the information terminal 300 via the communication part 201. The output part 34 outputs information indicating the carried load calculated by the calculation part 33. For example, the output part 34 outputs the information indicating the carried load calculated by the calculation part 33 to a display of the information terminal 300. The output part 34 reads, from the storage 202, the driver information in which the tractor ID and the user ID of the information terminal 300 of the driver of the tractor 1 are associated with each other. The output part 34 references the read driver information and outputs the information indicating the carried load to the information terminal 300 of the user ID stored in association with the tractor ID acquired by the acquisition part 31.

The output part 34 associates a location of a vehicle with information indicating the carried load of the vehicle calculated by the calculation part 33, and displays them over a map displayed on the information terminal 300. Before outputting the carried load, the output part 34 causes the storage 202 to store load history information in which (i) the plurality of tractor IDs acquired by the acquisition part 31 from the information terminal 300, (ii) the location information stored in association with each of the plurality of tractor IDs in the vehicle information, (iii) the plurality of acquisition dates and times, and (iv) the calculated plurality of carried loads, in association with each other. When the acquisition part 31 acquires the user's instruction requesting the output of the carried load and the tractor ID from the information terminal 300, the output part 34 displays, for a vehicle 100 of the acquired tractor ID, a plurality of locations of the vehicle 100 corresponding to different times and the carried loads of the vehicle 100 corresponding to the respective locations of the vehicle 100 over the map by referencing the load history information stored in the storage 202.

Figure 6:
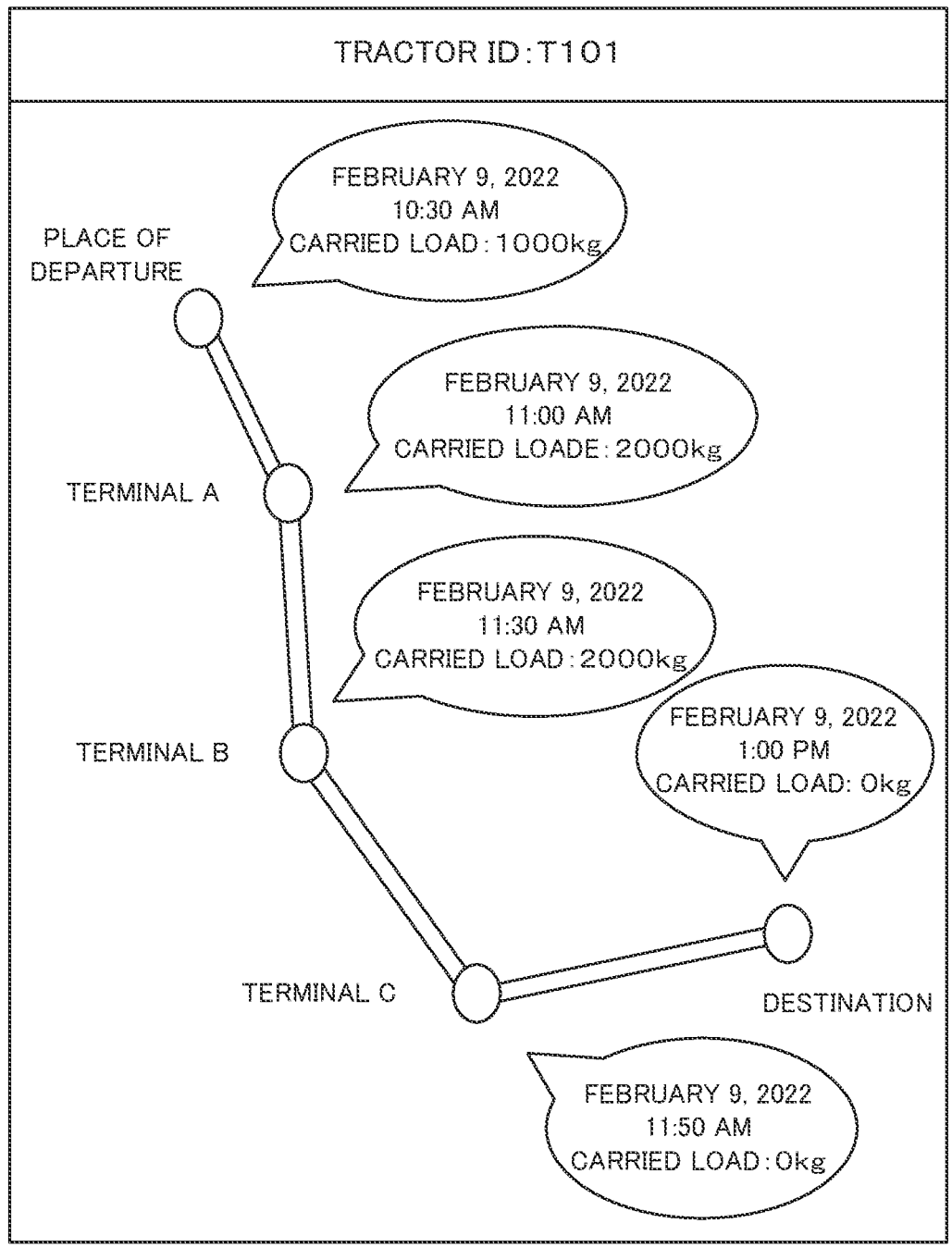
FIG. 6 shows an example of outputting information indicating the carried load by an output part.

FIG. 6 shows an example of outputting information indicating carried load by the output part 34. An image shown in FIG. 6 is displayed on the display of the information terminal 300. As shown in FIG. 6, the output part 34 displays a travel route of the vehicle 100 over a map. The output part 34 displays (i) acquisition dates and times of the location information and (ii) carried loads of the vehicle 100 corresponding to a plurality of locations on the travel route, respectively. In the case of FIG. 6, the output part 34 outputs information indicating that the vehicle 100 including the tractor 1 having the tractor ID "T101" arrived at Terminal A at 11:00 a.m. on Feb. 9, 2022, and that the carried load of the trailer 2 was 2000 kilograms at that timing.

The output part 34 may output the front axle load calculated by the calculation part 33, in addition to the carried load. The output part 34 may output (i) the location of the vehicle 100 and (ii) information indicating the carried load and front axle load of the vehicle 100 calculated by the calculation part 33 in association with each other on the map.

[Variation Example of Outputting the Carried Load and the Like to the Display of the Vehicle 100]

The output part 34 is not limited to the example in which the information indicating the carried load is output to the information terminal 300. For example, the output part 34 may output the information indicating the carried load to a display (not shown) such as a display audio mounted on the vehicle 100. Similarly, the output part 34 may output (i) the location of the vehicle and (ii) the information indicating the carried load of the vehicle calculated by the calculation part 33 in association with each other on a map displayed on the display of the vehicle 100. In this case, upon accepting an operation for displaying the carried load by the driver of the vehicle, the first controller 12 of the vehicle acquires the information indicating the carried load by transmitting the tractor ID and the trailer ID as well as transmitting a request for calculating the carried load to the information output apparatus 200.

[Processing Procedure by the Information Output Apparatus 200]

Figure 7:
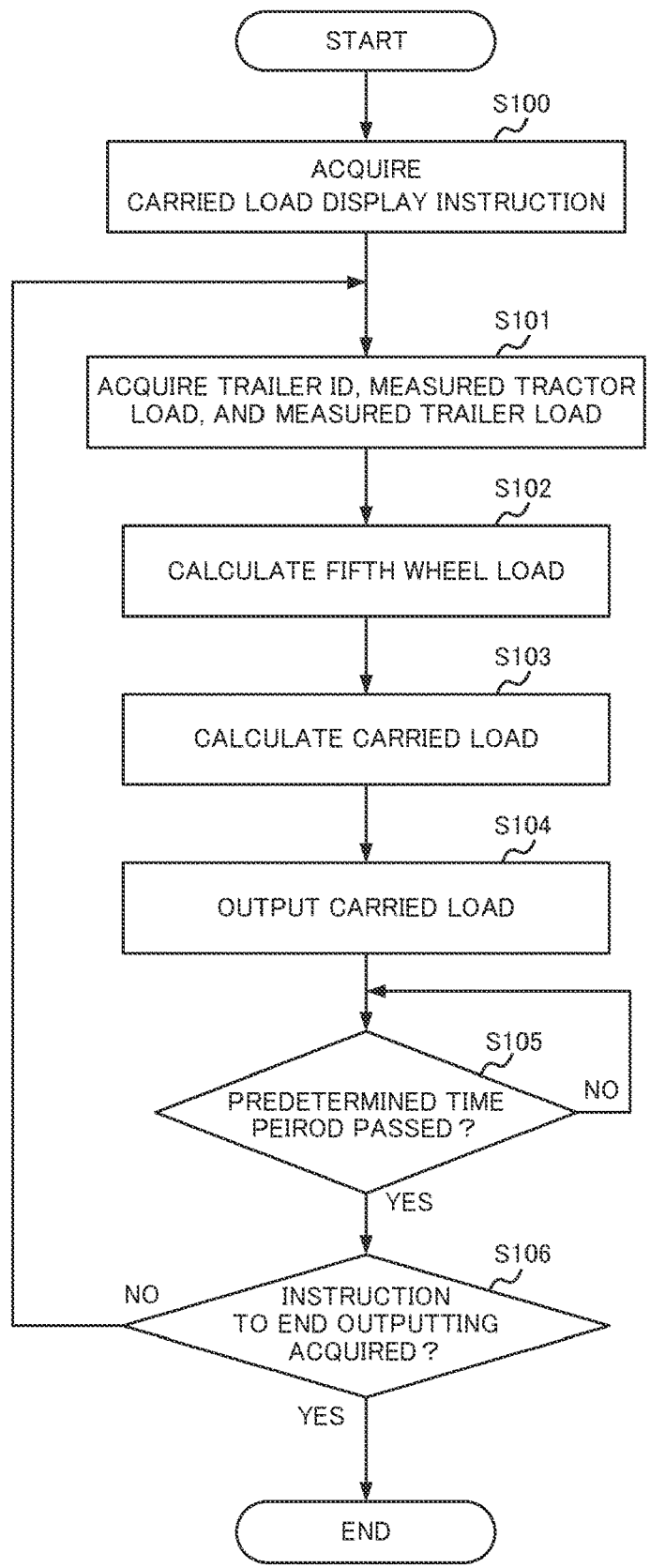
FIG. 7 is a flowchart showing a processing procedure by the information output apparatus.

FIG. 7 is a flowchart showing a processing procedure by the information output apparatus 200. This processing procedure starts when the acquisition part 31 acquires a user's instruction requesting the display of the carried load from the information terminal 300 of the user (S100), for example.

The acquisition part 31 acquires a trailer ID, a measured tractor load, and a measured trailer load from a vehicle 100 corresponding to a tractor ID acquired together with the user's instruction (S101). By referencing the tractor specification information stored in the storage 202, the identification part 32 identifies a tractor-uncoupled rear axle weight, a coupler offset, and a wheelbase stored in the storage 202 in association with the tractor ID acquired, from the information terminal 300, by the acquisition part 31 together with the instruction to display the carried load. By referencing the trailer specification information stored in the storage 202, the identification part 32 identifies a trailer weight stored in the storage 202 in association with the trailer ID acquired from the vehicle 100 by the acquisition part 31 together with the tractor ID.

The calculation part 33 calculates the fifth wheel load on the basis of the tractor-uncoupled rear axle weight identified by the identification part 32 and the measured tractor load acquired by the acquisition part 31 (S102). The calculation part 33 calculates the total value of the calculated fifth wheel load and the measured trailer load acquired by the acquisition part 31. The calculation part 33 calculates the carried load by subtracting the trailer weight identified by the identification part 32 from the calculated total value (S103). The output part 34 outputs information indicating the carried load calculated by the calculation part 33 to the information terminal 300 (S104).

Next, the control part 203 determines whether a predetermined time period, which is a waiting time period until the next calculation of the carried load, has passed (S105). When it is determined that the predetermined time period has passed (YES in S105), the control part 203 determines whether the acquisition part 31 has acquired a user's instruction requesting to finish the output of the carried load from the information terminal 300 (S106). When it is determined that the acquisition part 31 has acquired the user's instruction requesting to finish the output of the carried load (YES in S106) from the information terminal 300, the control part 203 finishes the processing. When it is determined that the acquisition part 31 has not acquired the user's instruction requesting to finish the output of the carried load from the information terminal 300 in the determination of S106 (NO in S106), the control part 203 returns to the processing of S101 and repeats the processing from S101 to S105.

[Effect of the Information Output Apparatus of the Present Embodiment]

In the information output apparatus 200 of the present embodiment, the identification part 32 identifies the specification information corresponding to the tractor ID and the specification information corresponding the trailer ID, and the calculation part 33 calculates the carried load of the trailer 2 on the basis of the identified specification information. Therefore, even when the trailer 2 towed by the tractor 1 is changed to another trailer 2, the calculation part 33 can calculate the weight of loaded goods by using the specification information of the tractor 1 and the specification information of the changed trailer 2.

The present disclosure has been described above on the basis of the exemplary embodiments. The technical scope of the present disclosure is not limited to the scope explained in the above embodiments, and it is obvious to those skilled in the art that various changes and modifications within the scope of the invention may be made. An aspect to which such changes and modifications are added can be included in the technical scope of the present disclosure is obvious from the description of the claims.

What is claimed is:

1. An information output apparatus that outputs information indicating a carried load of loaded goods mounted on a vehicle trailer in a vehicle configured with a vehicle tractor and the vehicle trailer, the information output apparatus comprising:
a memory that stores:
tractor specification information of a plurality of tractors including:
vehicle identification information of each of the tractors, tractor-uncoupled rear axle weight of each of the tractors, coupler offset of each of the tractors, and wheelbase of each of the tractors, and
trailer specification information of a plurality of trailers including:
vehicle identification information of each of the trailers, and
weight of each of the trailers; and
a processor executing programs stored in the memory, wherein the processor:
acquires vehicle identification information of a trailer, vehicle identification information of a tractor, a measured tractor load measured by a tractor rear axle weight sensor attached to the tractor, and a first measured load measured by a trailer weight sensor attached to the trailer;
identifies the tractor-uncoupled rear axle weight, the coupler offset, and the wheelbase with the same vehicle identification information to the acquired vehicle identification information of the tractor;
identifies the weight of the trailer with the same vehicle identification information to the acquired vehicle identification information of the trailer;
calculates a calculated load on a basis of the identified tractor-uncoupled rear axle weight, the identified coupler offset, the identified wheelbase, and the measured tractor load,
calculates the carried load by subtracting the identified weight of the trailer from a total value of the calculated load and the first measured load; and
outputs information indicating the calculated carried load.

2. The information output apparatus according to claim 1, wherein the processor calculates the calculated load by which the tractor supports the trailer between the tractor and the trailer by dividing a product of a value obtained by subtracting the identified tractor-uncoupled rear axle weight from the measured tractor load measured by the tractor rear axle weight sensor and the identified wheelbase by a value obtained by subtracting the identified coupler offset from the wheelbase.

3. The information output apparatus according to claim 1, wherein the processor:
acquires the measured tractor load, the first measured load, and location information indicating a location of the vehicle from the vehicle during traveling, and
outputs the location of the vehicle and information indicating the carried load of the vehicle on a map.

4. The information output apparatus according to claim 1, wherein the processor:
calculates a front axle load which is a load applied to front wheels of the tractor, on a basis of the calculated load, the wheelbase, and the coupler offset, and
outputs a location of the vehicle, information indicating the carried load of the vehicle, and information indicating the front axle load on a map.

5. An information output computer-implemented method for outputting information indicating a carried load of loaded goods mounted on a vehicle trailer in a vehicle configured with a vehicle tractor and the vehicle trailer, the method comprising:
acquiring vehicle identification information of a trailer, vehicle identification information of a tractor, a measured tractor load measured by a tractor rear axle weight sensor attached to the tractor, and a first measured load measured by a trailer weight sensor attached to the trailer;
identifying, by referencing a memory storing:
tractor specification information including:
vehicle identification information of a plurality of tractors, tractor-uncoupled rear axle weight of each of the tractors, coupler offset of each of the tractors and wheelbase of each of the tractors, and trailer specification information including:
vehicle identification information of a plurality of trailers, weight of each of the trailers, the tractor-uncoupled rear axle weight, the coupler offset, the wheelbase stored in the memory, in the tractor specification information, with the same vehicle identification information to the acquired vehicle identification information of the tractor;

identifying, by referencing the memory, the weight of the trailer stored in the memory with the same vehicle identification information to the acquired vehicle identification of the trailer;

calculating a calculated load on a basis of the identified tractor-uncoupled rear axle weight, the identified coupler offset, the identified wheelbase, and the measured tractor load;

calculating the carried load by subtracting the identified weight of the trailer from a total value of the calculated load and the first measured load; and outputting information indicating the calculated carried load.

* * * * *